United States Patent [19]

Kuhn

[11] 4,279,699
[45] Jul. 21, 1981

[54] COMBINED GRIPPER FOR A NUCLEAR REACTOR

[75] Inventor: Rolf Kuhn, Würzburg, Fed. Rep. of Germany

[73] Assignee: GG. Noell GmbH, Fed. Rep. of Germany

[21] Appl. No.: 970,208

[22] Filed: Dec. 18, 1978

[30] Foreign Application Priority Data

Dec. 17, 1977 [DE] Fed. Rep. of Germany ....... 2756370

[51] Int. Cl.$^3$ ............................................ G21C 19/20
[52] U.S. Cl. .................................. 176/30; 176/36 C; 294/86 A; 414/146
[58] Field of Search ....................... 176/30, 31, 32, 35, 176/36 R, 36 C; 294/86 A; 414/146

[56] References Cited

U.S. PATENT DOCUMENTS

| | | | |
|---|---|---|---|
| 3,691,011 | 9/1972 | Krüger | 176/30 |
| 3,768,668 | 10/1973 | Schukei | 176/30 |
| 3,945,514 | 3/1976 | Dose | 294/86 A |
| 3,950,020 | 4/1976 | Hoffmeister | 294/86 A |
| 3,990,591 | 11/1976 | Street | 414/146 |

Primary Examiner—Donald P. Walsh
Attorney, Agent, or Firm—McGlew and Tuttle

[57] ABSTRACT

A device for use in handling nuclear elements, such as control rods, fuel elements and blind rods in a nuclear energy plant, comprises, a hoist having a gripper rod assembly, which includes a tubular column structure into which is engaged a top movable part which is adapted to be connected to a lifting cable. The top movable part carries a crossbar which is engaged by engaging members which are pivotally mounted within the tubular column structure of the gripper rod assembly and which have pin elements thereon which, when the engaging members are positioned inwardly, engage in recesses between teeth defined on the crossbar. The engaging elements are moved by an actuating rod which is reciprocatable in the tubular column structure and includes a piston portion which is movable in a fluid cylinder portion so as to shift the engaging members between an outwardly oriented postion in which they engage into teeth elements of an annular rim of a gripper casing or an axially inwardly oriented position in which they are moved inwardly sufficiently so that the gripper rod assembly will clear a top opening of the casing and permit disengagement thereof. The lower end of the gripper rod includes gripper levers which may be actuated to engage a holding plate, for example, of a fuel element in the form of a bundle of control rods. When the gripper rod assembly is lowered by the hoisting cable, it may be centered to move into the top opening of the gripper casing. The lower end is then movable to the lower end of the gripper casing and into engagement with a top plate of a bundle of fuel elements or control rods. The gripper housing may be moved with the gripper rods to orient it over the fuel elements so that its lower end may be latched to the fuel element during the time at which the control rods are lifted upwardly therefrom and positioned within the gripper casing. The gripper casing has guide elements, such as predefined openings, which guide the control rods upwardly therethrough and they include means for stopping the upward movement of the gripper rod assembly.

6 Claims, 10 Drawing Figures

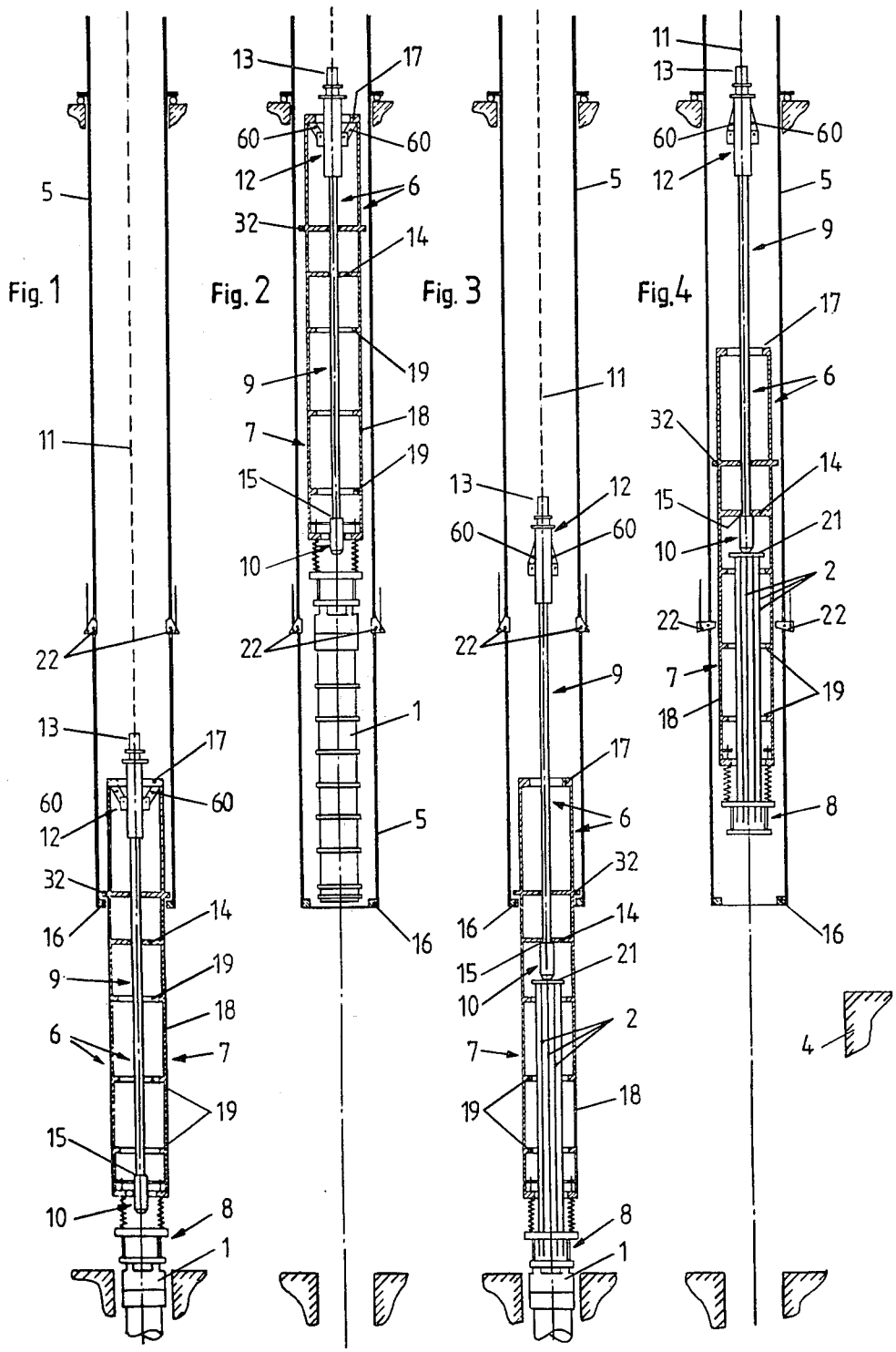

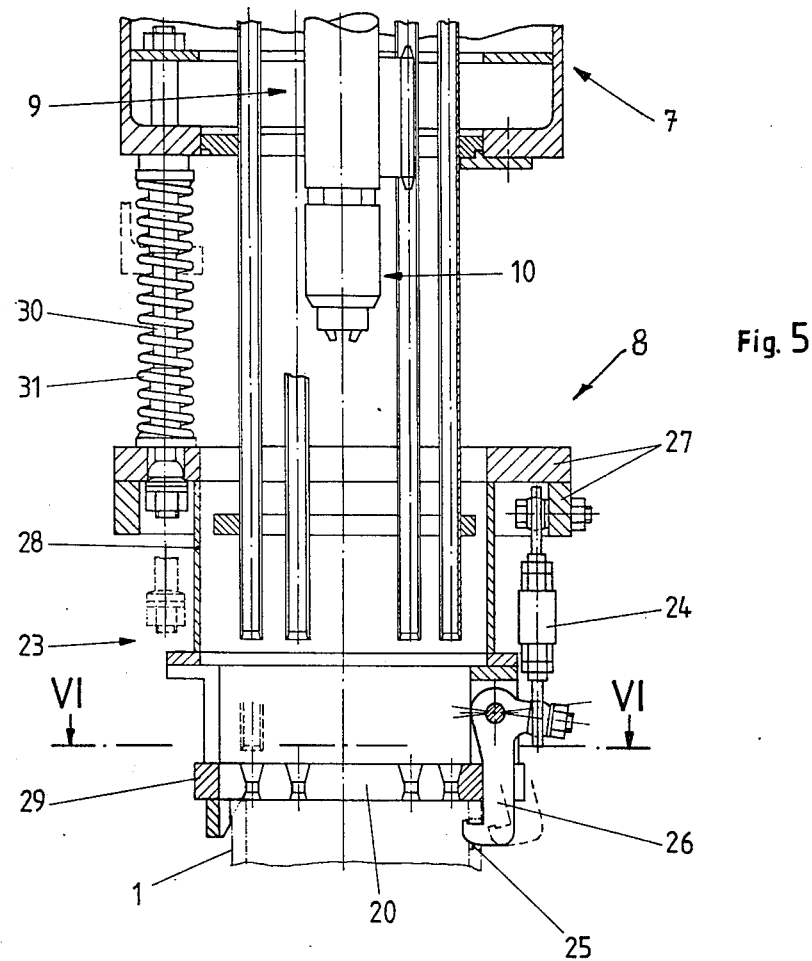
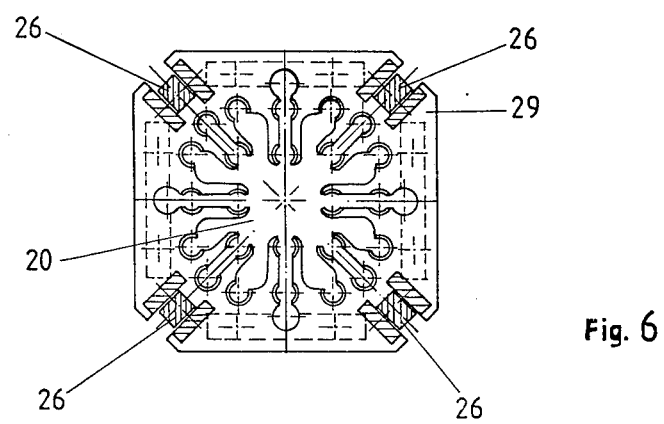

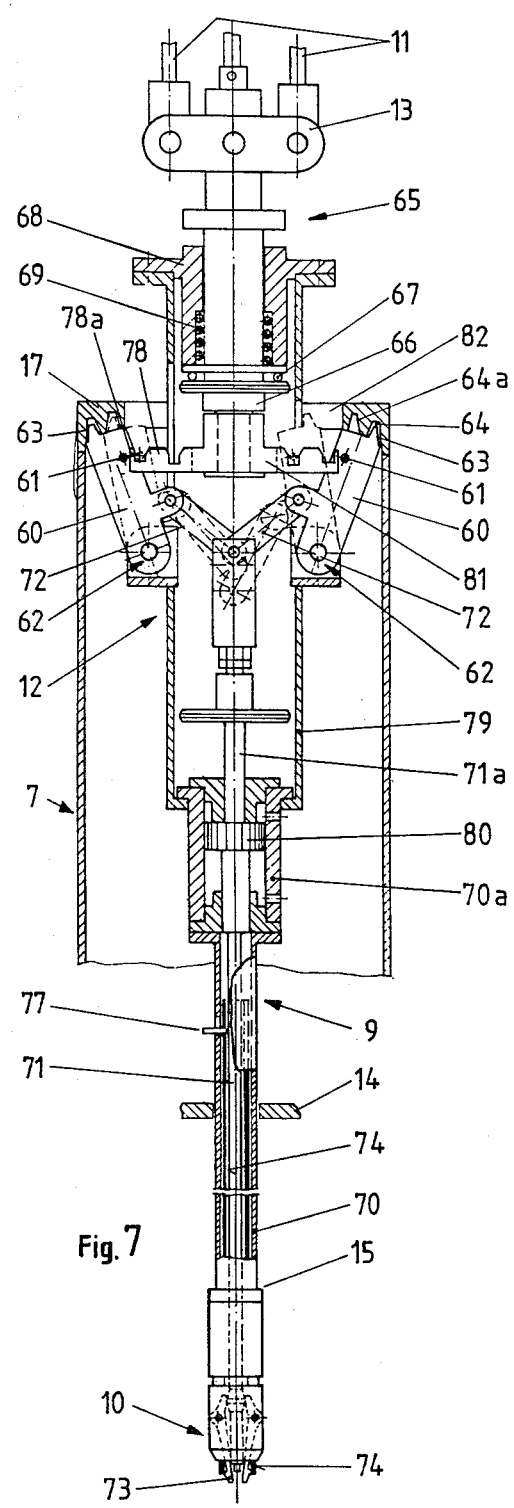
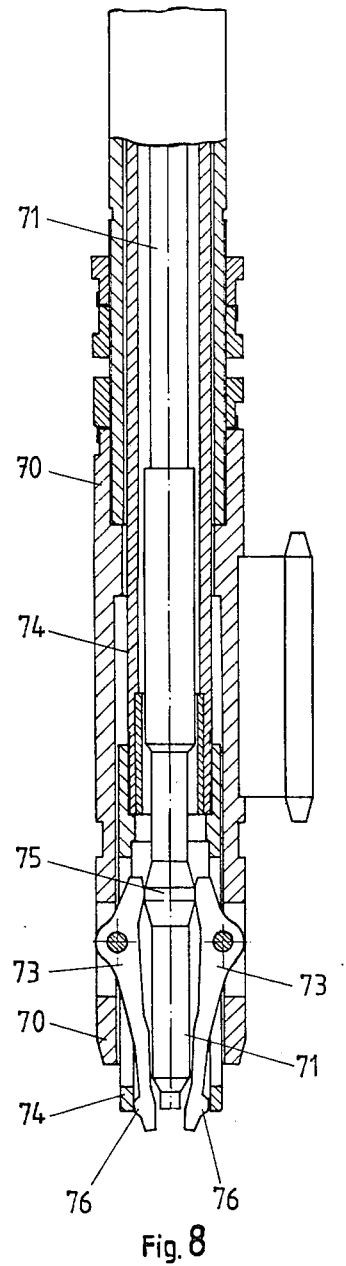
Fig. 7
Fig. 8

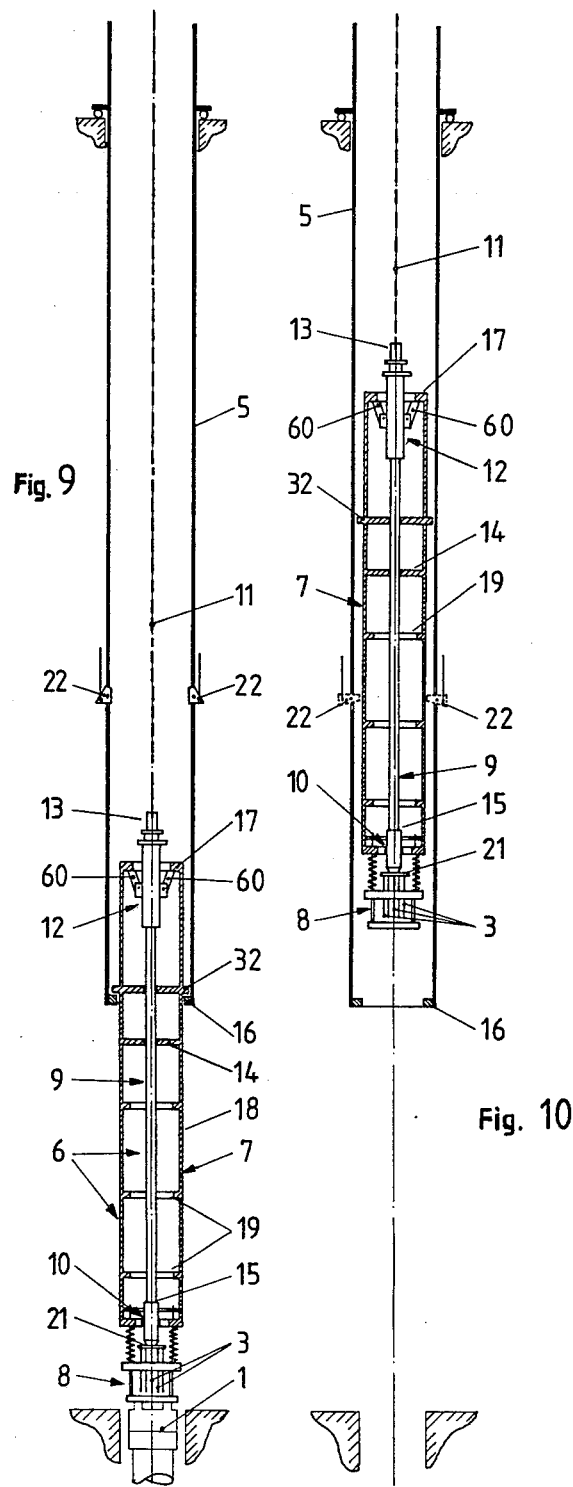

COMBINED GRIPPER FOR A NUCLEAR REACTOR

FIELD AND BACKGROUND OF THE INVENTION

This invention relates to nuclear energy devices in general and, in particular, to a new and useful device for use in handling nuclear elements, such as control rods, fuel elements and blind rods in a nuclear energy plant.

DESCRIPTION OF THE PRIOR ART

A gripper, also referred to as a loader or unloader, in which a centering socket is guided for vertical sliding motion in the guide tube is disclosed in German Pat. No. 1,764,176. An insert for guiding the control rod and carrying a gripper head on its lower end is slidably received in the socket, and a control rod gripper linkage is, in turn, slidably received in the insert. The linkage is moved by means of a winch. In order to lift the insert, the linkage is lifted after a shoulder of the gripper head applies from below against an upper flange of the insert. This flange soon applies against the bottom of the centering socket during the upward motion which, until then, had been set on stips of the guide tube. By further lifting of the linkage and of the insert, with the latter serving as a lateral support of the pulled control rods, the centering socket is taken along upwardly.

The purpose of the centering socket is to center the fuel element gripper in advance in the core or the storage rack and to establish a steady connection between the bridge carrying the guide tube and the supporting structure of the fuel elements during the withdrawal.

This design has the disadvantage that, upon depositing a fuel element, as the control rods are to be withdrawn therefrom, this operation cannot follow immediately. It is necessary instead to first further lower the linkage of the control rod gripper, until the head of the control rod gripper is set down on the common head of the control rods.

This means that the operation of withdrawing a fuel element must always be performed with the loader in its extended state, i.e., with the gripper heads spaced apart, whereby, the height of lift of the device is increased. Moreover, the centering socket extends in a pendent state downwardly beyond the gripper of the fuel element and impairs the guidance of the parts proper of the gripper, since these parts cannot slide directly on the guide tube.

SUMMARY OF THE INVENTION

The present invention is directed to a combined gripper which permits the reduction of the overall height available for the installation of the gripper, relative to the gripper designs of the prior art. In addition, the construction is simple in design, rugged in construction and ensures a secure operation of the gripper mechanisms.

In accordance with the invention, one of the telescoping members comprises a coupling device for taking along the other telescoping member, which device is engageable in the retracted position of the telescoping unit.

According to German Patent Disclosure OS 2,308,131, a joint motion of the two gripper heads can be obtained with the omission of the centering socket, by providing the heads on a common support or even casing of the gripper. In such a design, however, the withdrawn operating bars, which are long and thin, remain hanging freely downward and without guidance. The external gripper head whose support could remain below in a design with separate motion, thereby, making it possible to provide a corresponding mount, is positively taken along upwardly. There is now a risk that the operating bars will become warped differently and, consequently, make it impossible to introduce them into the narrow position bores in the storage racks or fuel element heads. Another complication is that, due to their horizontal and vertical motion, the bars are easily set in vibration.

On the contrary, the invention combines the advantages of the two designs discussed above, since the heads of the inventive gripper can be displaced both when they are coupled to each other and separately. A special centering socket can be omitted and the possibility of utilizing the engaging motions of the coupling device in a simple manner for actuating the operating parts of the gripper is provided.

The advantageous provision that the outer member of the telescoping unit accommodates a gripper rod as the centrally guided inner member and remains in sliding contact with the guide tube further contributes to the simplicity and ruggedness of the construction. In this design, only two gripper members are provided and they are directly, and thus exactly, guided in the guide tube.

In order to obtain a reliably operating, disengageable coupling between the parts of the telescoping unit, engaging members are advantageously provided in the upper zone of the gripper rod which, in the expanded position of the device, apply from below against a top flange of the gripper casing and, in the retracted position of the device, enable the gripper rod to pass through the top flange.

This operation of the couping is adapted to the manipulation of the short blind rods by the advantageous provision that, in the position where the engaging members apply against the top flange and the gripper head against the fuel element, the gripper rod can overtravel downwardly through a distance corresponding to the length of a blind bar.

The engaging members are advantageously designed as two levers extending symmetrically relative to the rod and upwardly, each from a hinge point, whose position is determined, in the expanded state, by an upper toe on each lever engaging a corresponding recess in the top flange and, in the lifted position of the telescoping unit, by teeth projecting from a movable portion of the gripper rod and cooperating with an element of the lever. Due to these features, the coupling device is a particularly rugged construction which is several times mechanically secured against unintentional disengagement.

Advantageously, the movable portion is designed as a crossbar carrying the teeth and comprises a shank supporting a thrust bearing on which the gripper rod is supported by means of a socket and a cooperating compression spring and, wherefrom, the telescoping unit is suspended. The gripper rod accommodates an actuating rod which is associated with a pressure fluid cylinder and its upper end is connected to links which, in turn, are connected to the engaging members, and its lower end is intended for pivoting two-armed, approximately vertically extending, gripper levers which are suspended on all sides from the lower wall of the gripper rod and form the gripper head. The levers are provided on their lower ends with projections and extend by these ends beyond an outer tube of the gripper rod and are spread apart by the pivotal motion to establish a coupling connection with the plate. In consequence, a mutual relationship is established between the engaging members and the gripper head for the operating rods to the effect that a definite function of the gripper head is associated with a definite position of the engaging members.

It is necessary to permit the gripper rod head to perform its function only in certain operational situations and to then watch the position of the gripper levers. For this purpose, it is advantageous to provide a sleeve which is placed between the actuating rod and the outer tube of the gripper rod, which is equipped with a portion penetrating this tube and carrying indicator means. In its lower position, corresponding to the non-operating condition of the gripper rod end, the sleeve surrounds the projections in their position of smallest circumference and extends downwardly to a level between the end of the outer tube and the end of the gripper levers and, in its upper position, the sleeve is flush with the end of the outer tube.

The gripper head for the fuel elements can be cleared for, or locked against operation. For this purpose, a resilient overtravel between the gripper head the the gripper casing is advantageously provided. It is advisable to make this gripper head movable in all directions, within limits, to allow the head to conform within certain (narrow) limits to the head of the fuel element to be withdrawn, should it be warped by heat. To take the gripper casing along in the extended position of the telescoping unit, it is also advantageous to provide a shoulder on the gripper rod which is located so as to butt against an upper web in the gripper casing only until the longest operating rod has been pulled into the gripper casing.

In accordance with the invention, another stop which is advantageously adjustable to project inwardly in the guide tube, is provided, to fix the telescoping unti between its end positions, in order to be able to set down the combined gripper in a substantially load-free manner on the higher-level storage rack.

Accordingly, an object of the present invention is to provide a device for use in handling nuclear elements which comprises a hoist having a gripper rod assembly, which includes a tubular column structure with a top movable part which is engaged in the column structure which is adapted to be connected to a hoist cable and which carries a crossbar portion which may be coupled selectively with a coupling member which is pivotally mounted within the column portion, the construction also including an actuating rod portion which shifts the coupling member and which also actuates a nuclear element engaging lever at the lower end of the gripper rod assembly, and wherein, the gripper rod is insertable into a hollow gripper casing which has a rim adjacent its top opening with means thereon for engaging with the coupling member to cause a lifting of the casing with the gripper assembly or to permit disengagement from the coupling member and the freeing of the gripper rod assembly from the gripper casing.

Another object of the invention is to provide a device for a nuclear reactor for selectively lifting a fuel element and loose operating rods, such as control rods, positioned within such element which are held by the ends of the bundle by means of a spider plate which comprises a vertically elongated guide tube, a telescopic unit which is displaceable in said guide tube and having retaining means for the lifted operating rods, said telescopic unit having outer and inner members with gripper heads, at least one of the members having a coupling device for the other telescoping member, which device is engageable in the retracted position of the telescoping unit.

A further object of the invention is to provide a device for handling nuclear elements which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings

FIG. 1 is a partial sectional view showing a combined telescopic gripping device for a nuclear reactor, constructed in accordance with the invention, and shown in the retracted position set down in a guide tube on a fuel element;

FIG. 2 is a view similar to FIG. 1 showing a gripper element along with a fuel element pulled into the guide tube;

FIG. 3 is a view similar to FIG. 1 showing the extended gripper in the lower position with the control rods pulled into the gripper casing;

FIG. 4 is a view similar to FIG. 3 and shows the gripper pulled into the guide tube;

FIG. 5 is a view similar to FIG. 1 showing the drive of the fuel element gripper and its arrangement at the end of the gripper casing, the pawls being displaced into the drawing plane;

FIG. 6 is a sectional view taken along the line VI—VI of FIG. 5;

FIG. 7 is an enlarged view similar to FIG. 1 showing the operation of the coupling device for coupling the gripper rod assembly to the gripper casing;

FIG. 8 is a partial enlarged sectional view of the lower portion of the gripper rod shown in FIG. 7;

FIG. 9 is a view similar to FIG. 1 showing the retracted gripper in the lower end position with the blind rod pulled into the gripper casing; and FIG. 10 is a view similar to FIG. 9 showing the gripper pulled into the guide tube.

DESCRIPTION OF THE PREFERRED EMBODIMENT

Referring to the drawings in particular, the invention embodied therein, comprises a device for use in handling nuclear elements, such as a fuel element 1, and bundles of control rods 2 and/or blind rods 3. Fuel elements 1 and operating rods assembled into bundles, such as, control rods 2 or blind rods 3, are to be transferred from the core of a nuclear plant into a storage rack 4 located at a higher level and remote, or vice versa. For this purpose, a vertical guide tube 5 is provided which is secured, so as to be rotatable about its longitudinal axis, to a so-called coordinate trolley system erected above the reactor (not shown) and hangs down to the vicinity of a storage rack 4.

The operation of pulling and supporting the objects is performed by a telescoping unit 6 comprising a gripper casing 7 functioning as the outer member and equipped with a gripper head 8 for the fuel elements 1, and a gripper rod 9 functioning as the inner member and equipped with a gripper head 10 for the operating rods. The members of telescoping unit 6, which is displaceable within guide tube 5 on a cable 11, can be connected to each other, in their upper zone and in a retracted state, by means of a coupling device 12. The coupled position is shown clearly particularly in FIGS. 2 and 10, wherefrom, it may be learned that, with telescoping unit 6 retracted into guide tube 5, the point of attachment 13 of cable 11 is still located within guide tube 5. If, in this instance, the gripper casing 7 is suspended through an upper web 14 from a shoulder 15 of gripper rod 9, as shown in FIGS. 3 and 4, a substantially greater height of lift would be necessary to pass the fuel element 1 over the edge of storage rack 4. On the other hand, the fact that coupling device 12 is disengagable makes it possible for the control rods 2, for example, to be pulled into gripper casing 7, as shown in FIGS. 3 and 4.

Guide tube 5 has a stop 16 on its bottom edge against which gripper casing 7 may apply by a collar 32 in order to prevent it in its lower operating position from loading fuel element 1 with the full weight. Further stops 22, which can be adjusted to project inwardly, have the same function if gripper casing 7 is set down on storage rack 4.

Adjacent the collar 32, the space surrounded by cylindrical wall 18 of gripper casing 7 extending downwardly is sectioned by upper web 14 and further by holders 19. The holders 19 circumscribe cross-sectional openings 20 (FIG. 6) having a spider configuration and a certain oversize relative to a plate 21 of identical shape. This plate 21, along with the operating rods 2 mounted thereon, must be pulled through openings 20 (FIGS. 3 and 6) during which motion, the operating rods are guided over their entire length so that they cannot oscillate.

As shown in FIG. 5, gripper head 8, which is provided on the lower end of gripper casing 7, substantially comprises a mount 23 and pawls 26 which can be engaged into receiving apertures 25 of fuel element 1. The pawls are pivotally suspended from an extension 28 extending downwardly of a flange 27 of mount 23 and carrying a ring 29 at its lower end, and they can each be pivoted in the manner of a bell crank by means of a rod 24. Holders 19 are provided along the casing 9 close to the ring 29 so that even the very short blind rods 3 are guided therein in their withdrawn position.

Mount 23 is displaceably connected to gripper casing 7 by means of long bolts 30 which extend through flange 27 and guide the same during displacement. Flange 27 is biased in the direction of the bolt heads by means of compression springs 31. In its initial position, mount 23 is centered relative to the longitudinal axis of gripper casing 7 without play. Since the bolts 30 are recessed behind their heads, a lateral play becomes effective during a displacement of mount 23, so that within certain limits, the mount or head may conform its position to the contact surface of fuel element 1 which might be deformed by heat.

Gripper rod 9, which is directly attached to cable 11 at a location above coupling device 12, as shown in FIG. 7, comprises an outer tube 70 which is provided with a shoulder 15 in its lower part and is enlarged to a pressure-fluid cylinder 70a at its upper end. The cylinder is followed in the upward direction by a columnar structure 79 supporting a socket 68 on its top. Socket 68 and, thereby, also gripper rod 9 and gripper casing 7 and the load bear against a thrust bearing 67 which is supported on a part 65 forming a portion of gripper rod 9 and extending in the axis of socket 68. Part 65 is suspended from cable 11 and is vertically movable relative to socket 68. A compression spring 69 is provided between the bottom portion of the socket and thrust bearing 67 to maintain a positive connection after outer tube 70 comes to a standstill and part 65 is lowered further.

A piston 80 of pressure fluid cylinder 70a is provided on the end of a long actuating rod 71 which extends inside of the outer tube 70. The bottom end of rod 71 projects slightly beyond the lower end of outer tube 70. However, in the rest position shown in FIG. 8, it does not quite reach up to the ends of gripper levers 73. These levers 73 are two-armed and pivotally suspended, in a substantially vertical position, from the inside of outer tube 70. With their upper arm portions, gripper levers 73 apply against an enlarged portion 75 of actuating rod 71, while their lower arms embrace the thinner or tapered end of rod 71. As rod 71 is displaced downwardly, the lower arms, which are provided with projections 76, are spaced apart while the upper arms slide past the enlarged portion and can move inwardly.

To this end, it is necessary to provide a sleeve 74 which is displaceable between outer tube 70 and actuating rod 71 and, in its rest position, closely embraces projections 76 and projects by its lower end to a location between the lower ends of gripper levers 73 and the lower end of outer tube 70, while in its retracted position, the sleeve end is flush with that of outer tube 70. The motion of sleeve 74 is made observable by means of a portion penetrating outer tube 70 and carrying an indicator 77, so that the position can be determined and electrical blocking and release means for further manipulation can be controlled.

Starting from the upper surface of piston 80, actuating rod 71 comprises a portion 71a extending upwardly from pressure-fluid cylinder 70a and carrying two links 72 hinged thereto which extend symmetrically from the rod and actuate the coupling device 12 by their other ends. For this purpose, the ends of links 72 are each connected to the middle portion of an engaging member 60. Members 60 are disposed symmetrically relative to the rod in the outer zone of the coupling device and are designed substantially as upright levers which are hinged, by their lower ends at 62, to column 79 and are provided, on their other ends, with upwardly projecting toes 63 cooperating with corresponding recesses 64 and 64a provided in a top flange 17 of gripper casing 7.

Engaging members 60 in their inwardly pivoted position shown in dotted lines engage by a laterally projecting pin or element 61 behind teeth 78 which project from a horizontal crossbar 81. Crossbar 81 is provided on a shank 66 forming a portion of movable part 65. In this position of engaging members 60, column 79, i.e., also gripper rod 9, can pass through the opening 82 of top flange 17.

In the intermediate position determined by recesses 64a, further teeth 78a of crossbar 81 cooperate with pin 61 and, in the outer position of engaging members 60 in which they engage recesses 64, only teeth 78a extend adjacent pin 61.

The combined gripper operates as follows:

(A) While handling fuel elements (FIGS. 1, 2 and 5):

As mentioned above, in the rest position of the combined gripper, the engaging members 60 of coupling device 12 are in their expanded position and gripper casing 7 is supported on these members, whereby, a double mechanical locking is obtained, one due to the engagement of lever toes 63 with recesses 64 and the other due to the blocked pivotal motion of members 60 by means of teeth 78a and pin element 61. Gripper head 8 and gripper casing 7 are spread apart up to reaching the stop and pawls 26 are in their open position since they are not loaded. In this position, they are mechanically locked by means which have not been shown. The gripper can be displaced vertically.

As the gripper head 8 is set down on a fuel element 1, gripper casing 7 travels slightly further, whereby, spring 31 is compressed and pawls 26 are unlocked. As the collar 32 of the gripper casing 7 butts against stop 16 of guide tube 5, the travel or stroke is then terminated. The further operation depends on whether a fuel element 1 or operating rods are to be withdrawn.

In order to withdraw a fuel element 1, pawls 26 engage receiving apertures 25 of element 1. By the following lifting operation or the spring-back resilience of gripper head 8, pawls 26 are locked in their new position even before the lifting of fuel element 1 is started. Aside from the mechanical locking means, the plant is equipped with switches (not shown) indicating, checking, and securing any movement during the withdrawal of fuel elements 1. For example, aside from a contact switch on the front side of gripper head 8, switches are provided which are associated with the end positions of gripper head 8 relative to gripper casing 7 and of pawls 26.

It is not possible, for example, to actuate the lifting device while the pawls 26 are in an intermediate position and cannot completely engage receiving apertures 25 because they are jammed, or while pawls 26 engage the element outside the apertures. The lifting device is also stopped if, during the lowering, the fuel element 1 is set on the edge of its receiving hole.

(B) While handling operating rods (FIGS. 3, 4 and 7 to 10):

If, after setting down of gripper head 8, compression of spring 31 and stopping of the lifting device, operating rods, for example, control rods 2, are to be withdrawn, gripper rod 9 travels further and engaging members 60 disengage from top flange 17 of gripper casing 7.

Outer tube 70 of gripper rod 9 is centered in a gripper hole of plate 21 by means of the ends of gripper levers 73 during which operation sleeve 74 is retained. As soon as, upon a continued travel, projections 76 reach the corresponding horizontal groove provided in plate 21, indicator 77 of sleeve 74 casues a stopping of the lifting device. In this receiving position, movable part 65, with its shank carrying the crossbar, has moved downwardly to an extent permitting elements 61 to disengage from teeth 78 and 78a and engaging members 60 to perform a pivotal motion toward shank 66. Prior to this, thrust bearing 67 and socket 68 have already been disengaged.

While pressure-fluid cylinder 70a causes the pivoting through links 72, it also pushes actuating rod 71 downwardly, so that gripper levers 72 are spread apart. Control rods 2 are thereby firmly connected to outer tube 70, through plate 21 and gripper levers 73. Due to the lifting motion, thrust bearing 67 again applies against socket 68, and teeth 78 of movable part 65 engage from below pin elements 61 of engaging members 60 which are now in their position close to the rod axis and are thereby mechanically locked. While coupling device 12 passes through opening 82 of top flange 17, control rods 2 are pulled into gripper casing 7 until shoulder 15 of gripper rod 9 butts against upper web 14 of gripper casing 7 and takes it along. The position shown in FIG. 4 is then reached.

Here again, electrical control switches are actuated in the end positions of the actuating members. Interconnected switches are associated, for example, with indicator 77, the engaging members 60, and the movable part 65. If, for example, engaging members 60 become jammed in an intermediate position outside that corresponding to recesses 64a, the lifting operation cannot be performed. If, in a non-load condition, sleeve 74 is moved upwardly at any level, for example, due to a malfunction, the lifting device switches off. The device is also switched off if, for example, gripper levers 73 or a bundle of operating rods are not introduced in but are set on the storage rack 4. Since, in such a case, outer tube 70 is stopped while movable part 65 and thrust bearing 67 disengage from socket 68, a limit switch is actuated.

As compared to other operating rods, blind rods 3 are very short. It serves little if any purpose to pull them so far into gripper casing 7, as to engage shoulder 15. The members of telescoping unit 6 may, in this instance, instead remain coupled to each other. The operation then differs from that described in conection with control rods in that actuating rod 71 cannot travel downwardly to the full extent, because the gripper hole in plate 21 is closed on its underside.

In the end position of actuating rod 71 corresponding to this situation, engaging members 60 can be displaced only slightly inwardly. However, since they are still pointed outwardly, they take gripper casing 7 along. The short distance of lift up to this stop is sufficient to bring the withdrawn blind rods into a position flush with the lower edge of gripper head 8.

While a specific embodiment of the invention has been shown and described in detail to illustrate the application of the principles of the invention, it will be understood that the invention may be embodied otherwise without departing from such principles.

I claim:

1. A device for selectively lifting a fuel element and an assembly of operating rods of a nuclear reactor, for example, control rods, which are positioned in such an element, the assembly being of the type having means interconnecting the ends of the rods to form a bundle, comprising a vertically elongated guide tube, a telescoping unit reciprocatably displaceable in said guide tube for telescopic movement relative thereto, said telescopic unit including a tubular casing slidably mounted to said guide tube, a gripper head comprising a mounting member, connecting means for resiliently interconnecting said mounting member to one end of said casing for relative overtravel therebetween, said gripper head being movable within limits in any direction during the overtravel, and pawl means for releasably engaging the fuel element.

2. The device according to claim 1 further comprising a hoist having a gripper rod assembly, said gripper rod assembly including a tubular column structure, a top movable part movably mounted in said tubular column structure and having one end extending out of said tubular column structure with a hoist cable connection and having an opposite end with a crossbar portion disposed in said tubular column structure, an actuating rod spaced from said top movable part in said tubular column structure, a coupling member pivotally mounted in said tubualr column structure and connected to said actuating rod and being movable by movement of said actuating rod between a coupled position in which said coupling member is engaged with said crossbar portion and is oriented inwardly and to an uncoupled position in which it is oriented outwardly, an operating rod engaging lever pivotally mounted on said tubular column structure adjacent the lower end thereof, and actuating means on said tubular column structure connected to said actuating rod for displacing said actuating rod to move said operating rod engaging lever to engage the assembly of operating rods, the displacement of said actuating rod also shifting said coupling member; said gripper head including a vertically elongated hollow gripper casing having top and bottom openings of a size to permit passage of said gripper rod assembly therethrough, said top opening being bounded by an interior rim with retaining means engageable with said coupling member when it is in an uncoupled position oriented outwardly so that upward lifting movement of said gripper rod assembly will cause lifting movement of said gripper head therewith, said gripper head opening permitting clearance of said gripper rod assembly when said engaging member is oriented in an inward position, said gripper head having guide means defined therein for the guiding of the nuclear element being lifted by said gripper rod assembly.

3. A device for use in handling nuclear elements, as claimed in claim 1, wherein said gripper head includes a gripper plate at the lower end of said casing including a support flange, an extension part connected to said support flange, a pawl mounted on said extension part and being pivotal between a position engaged with the plate and a position disengaged therefrom, a connecting rod connected to said pawl for shifting said pawl and having an opposite end connected to said flange, a bolt extending between the lower end of said gripper casing and said flange and being movable in each of said casing and said flange and a compression spring around said bolt extending between said casing and said flange permitting movement of said flange with said extension relative to said casing, said connecting rod being movable by the relative movement for effecting shifting of said pawl.

4. A device for a nuclear reactor, as claimed in claim 1, including a stop provided in the guide tube and adjustable to project inwardly to fix said telescoping unit between the end positions thereof.

5. A device for a nuclear reactor, as claimed in claim 2, including a shoulder portion on said gripper rod located so as to butt against an upper web provided within the gripper casing only after the longest operating rod has been pulled into said gripper casing.

6. A device for a nuclear reactor as claimed in claim 2, including a sleeve provided between said actuating rod and said tubular column structure having indicating means penetrating said tubular column structure and terminating, in its lower position corresponding to the non-operative state of the gripper rod end, between the ends of said tubular column structure and said engaging lever.

* * * * *